Figure 1:
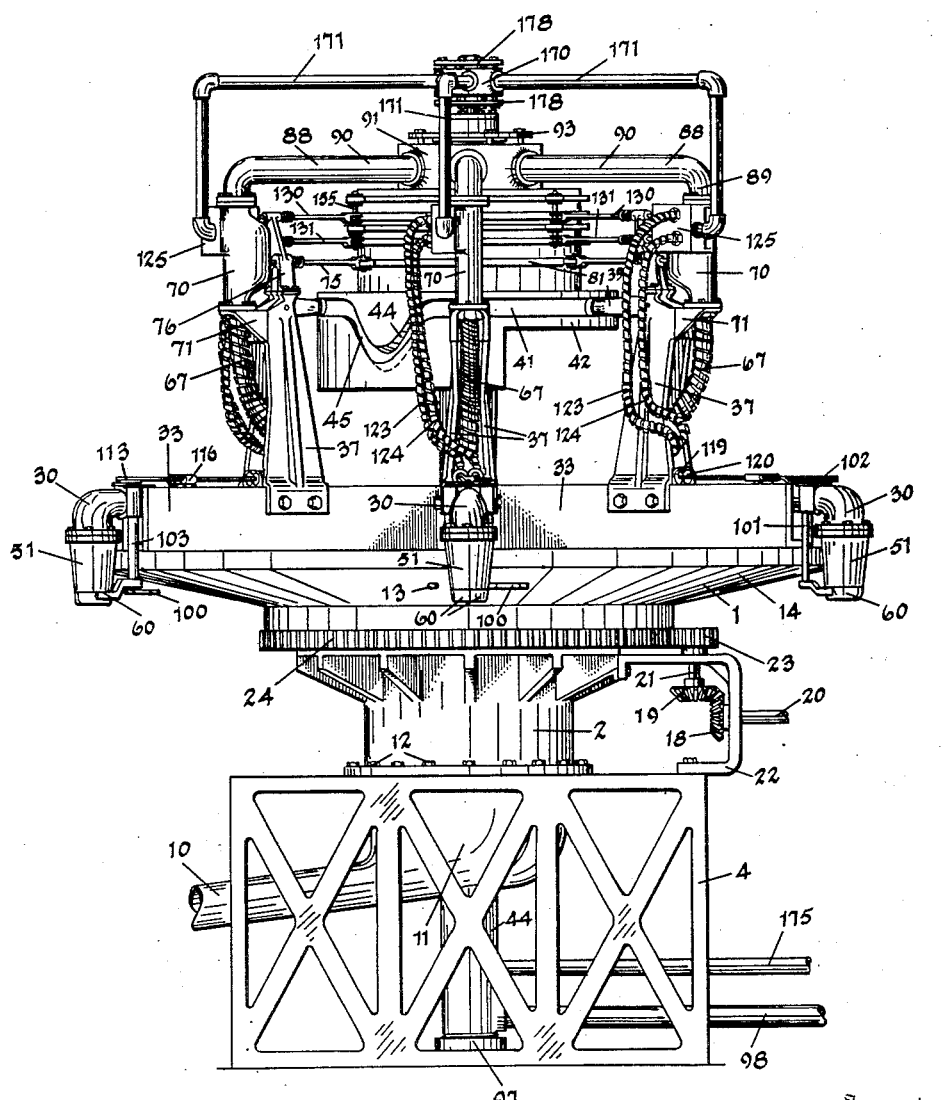

Jan. 10, 1933.   J. F. DOWLING   1,894,030
GLASS FEEDING MACHINE
Original Filed Aug. 11, 1928   6 Sheets-Sheet 1

Inventor
John F. Dowling
By Faust F. Crampton
Attorney

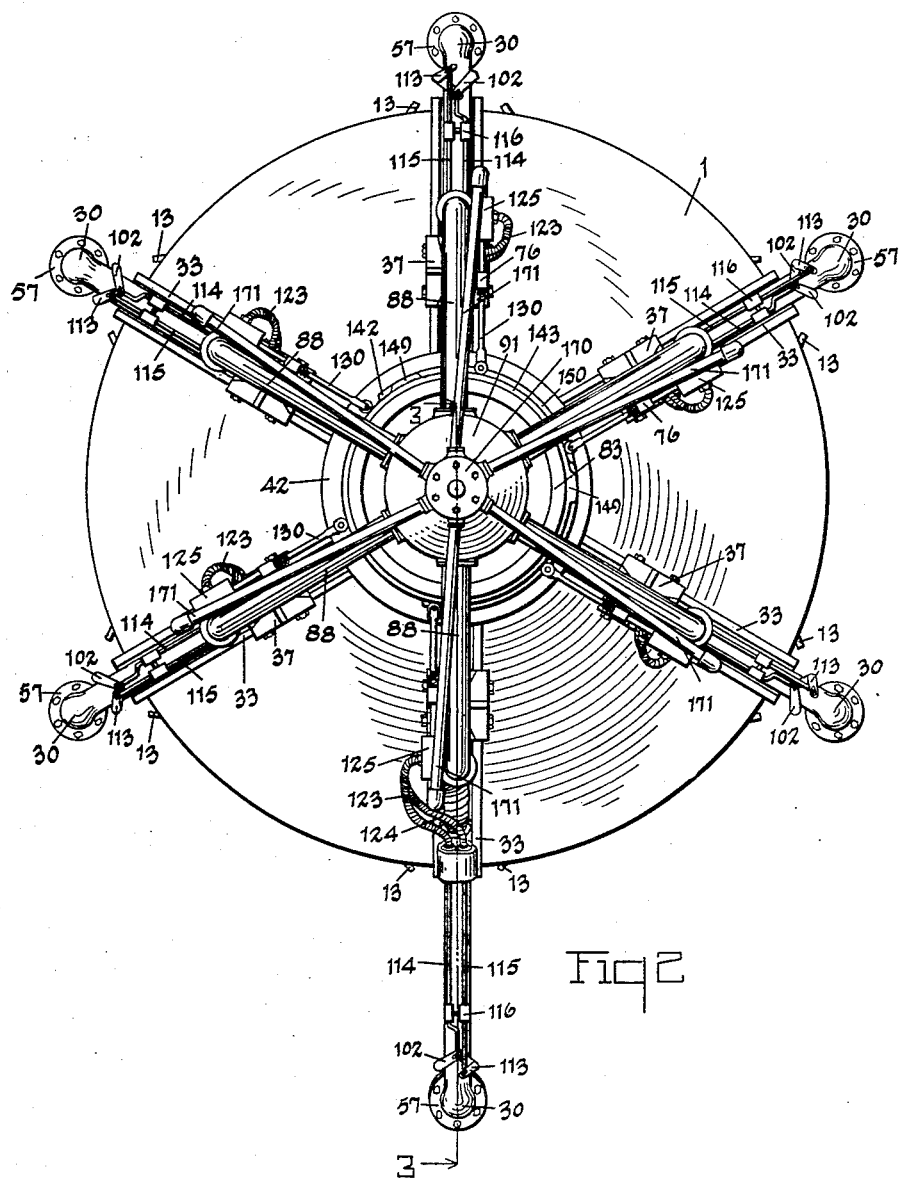

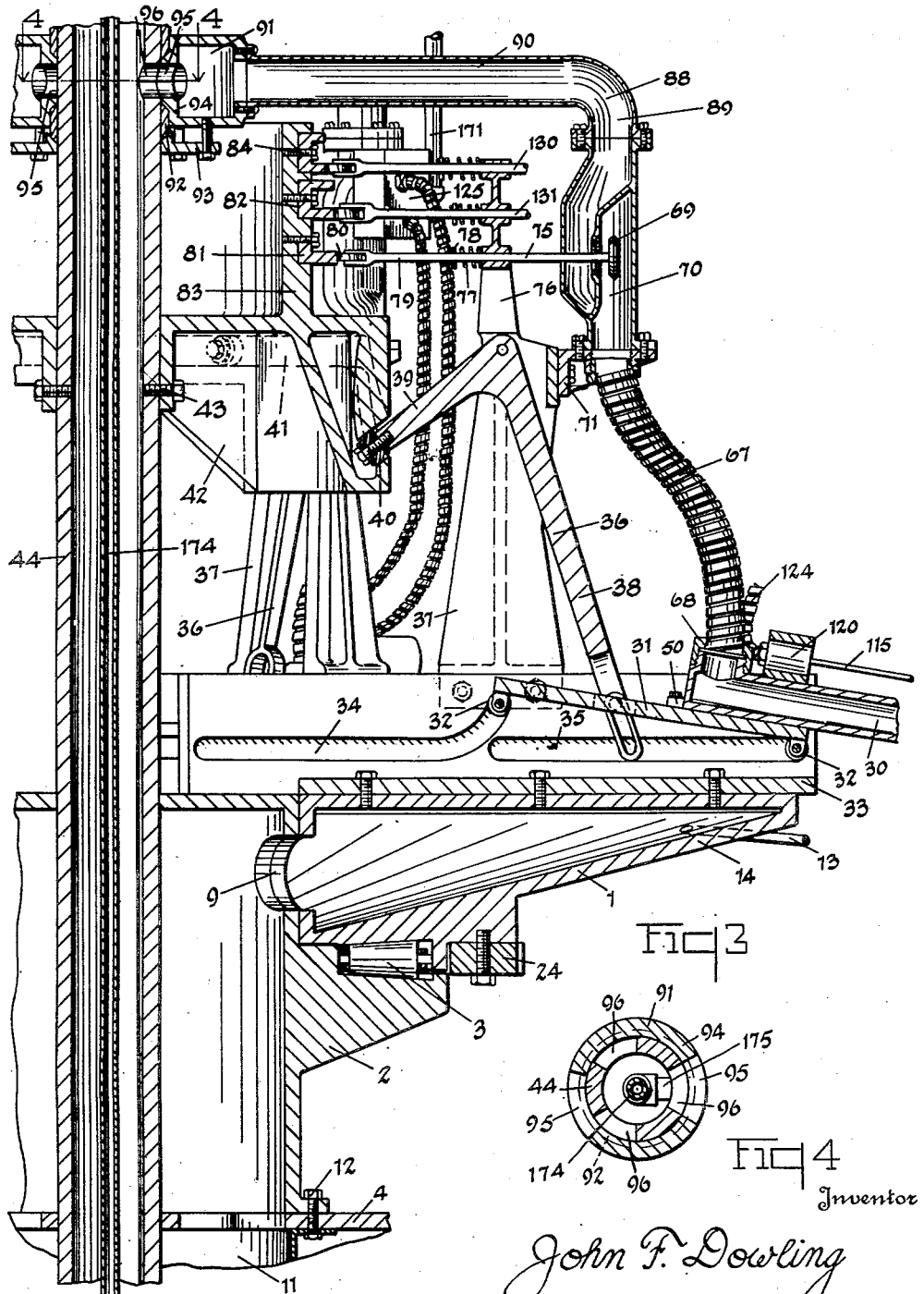

Jan. 10, 1933. J. F. DOWLING 1,894,030
GLASS FEEDING MACHINE
Original Filed Aug. 11, 1928    6 Sheets-Sheet 4
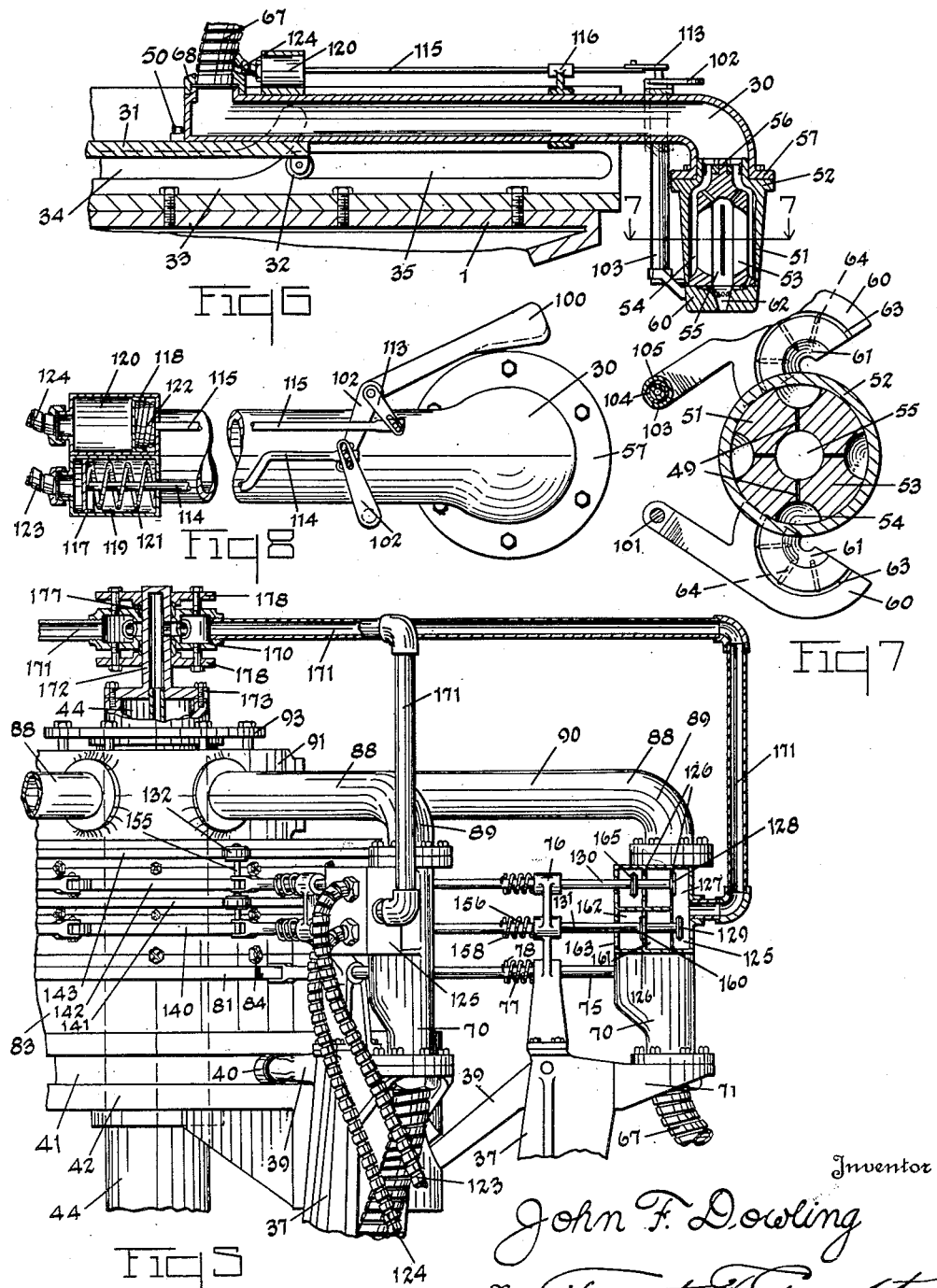

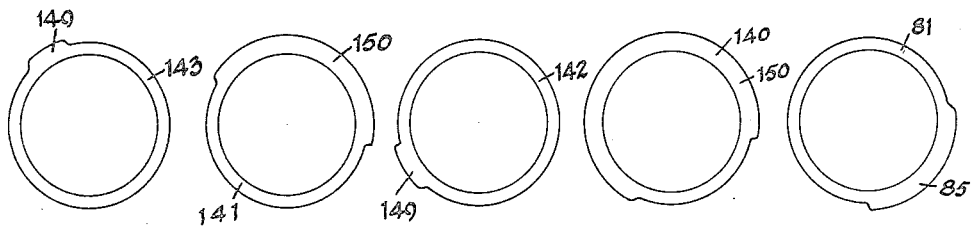
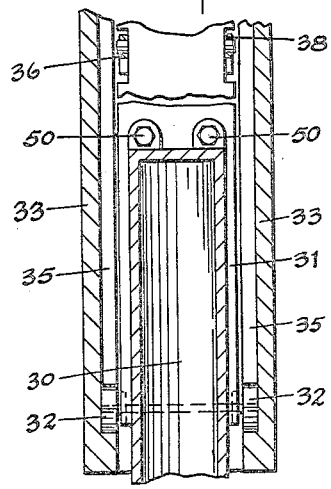
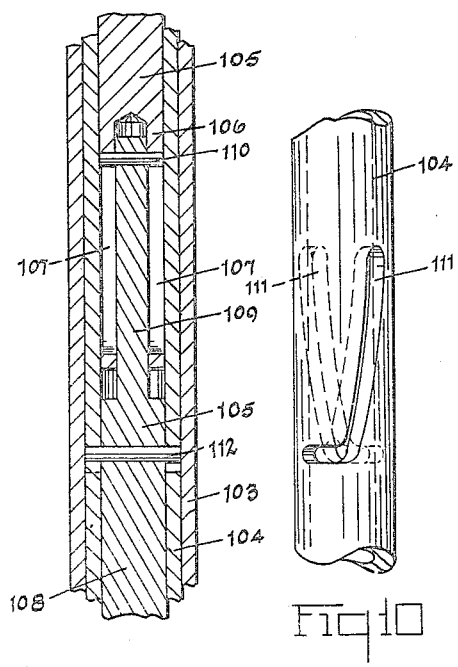

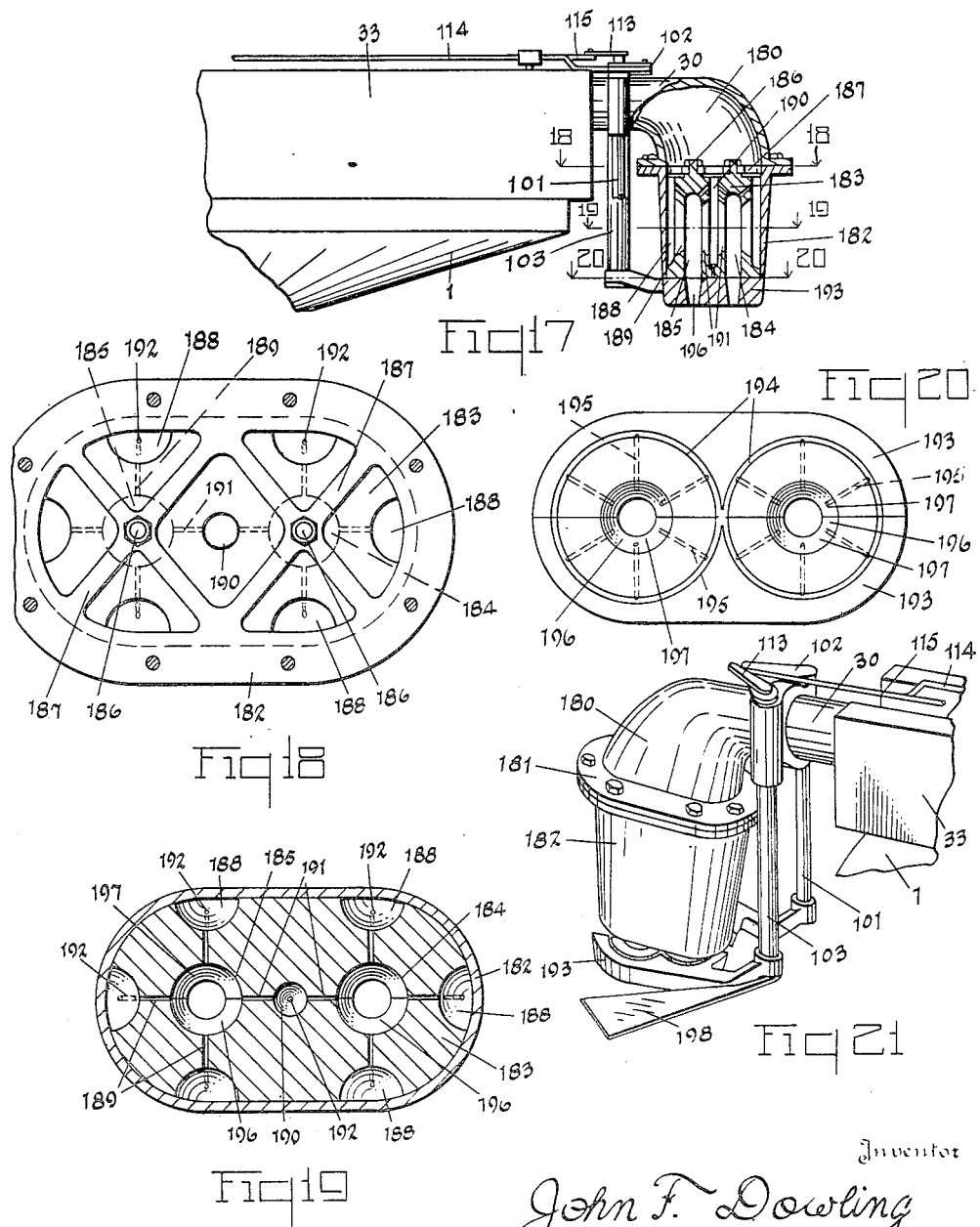

Patented Jan. 10, 1933

1,894,030

UNITED STATES PATENT OFFICE

JOHN F. DOWLING, OF TOLEDO, OHIO, ASSIGNOR TO OWENS-ILLINOIS GLASS COMPANY, OF TOLEDO, OHIO, A CORPORATION OF OHIO

GLASS FEEDING MACHINE

Application filed August 11, 1928, Serial No. 299,004. Renewed July 21, 1930.

My invention relates to a machine for gathering definite quantities or mold charges of glass. The invention particularly provides a glass feeder for gathering definite and uniform quantities of glass from a glass furnace regardless of the temperature and the quality of the glass and delivering it to a plurality of machines in accordance to the performance of such machines in their operations on the glass. Where the machines perform their operations in substantially the same period or are so constructed as to move their receptacles in position for receiving glass at the expiration of equal periods of time, the glass feeder operates to feed such machines in succession. The feeder is provided with adjustable parts whereby the delivery of the glass from the feeder to the machine may be caused to take place at desired points in the operation of the feeder and, consequently, the deliveries occur according to the adjustments that are made.

The invention thus provides a machine that may be used in conjunction with a plurality of glass machines whereby a plurality of glass operating machines may be fed from a single furnace work hole. Such machines may be more easily distributed about the glass feeding machine so as to receive glass therefrom while practically only a single glass operating machine may be located at a furnace work hole to obtain or receive glass therefrom. Economy of space is thus provided and, moreover, a number of glass manipulating machines may be rapidly served by the feeder which is particularly designed to efficiently perform the single function of feeding the glass to the glass manipulating machines.

The invention may be contained in structures which vary in detail and, to illustrate a practical application of my invention, I have selected one form of machine as an example of such structures and shall describe it hereinafter. The selected machine is shown in the accompanying drawings.

Fig. 1 is a view of the side of the machine. Fig 2 is a view of the top of the machine, one of the operating parts being extended from the machine. Fig. 3 is a view of a section taken on the plane of the line 3—3 indicated in Fig. 2. Fig. 4 is a view of a section taken on the plane of the line 4—4 indicated in Fig. 3. Fig. 5 is a view of the upper portion of the machine, a part being shown in section to show details not illustrated in Fig. 3. Fig. 6 is a view of a cross section illustrating a detail of the machine. Fig. 7 is a view of a section taken on the plane of the line 7—7 as indicated in Fig. 6. Fig. 8 is a top view of the detail shown in Fig. 6, a part being shown in section. Fig. 9 is a view of a cross section illustrating a detail of the machine. Fig. 10 is a side view of one of the parts shown in Fig. 9. Figs. 11 to 15 inclusive are views illustrating diagrammatically the operating periods of various parts of the machine. Fig. 16 is a view of a detail, a part being shown in cross section. Fig. 17 is a view illustrating a modification of the glass conveying members, the modified portions being shown in cross section. Fig. 18 is a view of a section taken on the plane of the line 18—18 as indicated in Fig. 17. Fig. 19 is a view of a section taken on the plane of the line 19—19 as indicated in Fig. 17. Fig. 20 is a view of a section taken on the plane of the line 20—20 as indicated in Fig. 17. Fig. 21 is a view in perspective, the view showing the rear of the conveying member.

In the form of construction shown in Fig. 1, the machine is provided with reciprocating members which operate to cause the delivery of glass to one or more glass molding machines. The machine is timed so that it will operate to deliver glass to the glass molding machines in succession.

The operating parts of the machine are located on and secured to a spider or carriage 1 which is rotatably supported on a base 2 by conical bearings 3. The base 2 is located on an iron framework 4 which may vary in height so as to locate the machine properly with respect to the furnace and the molding machines. The spider 1 and the base 2 are formed of hollow castings so that cooling air currents may be directed into the body of the spider or carriage 1 from a pipe 10 through suitable oval openings 9 in the walls of the spider 1 and the base 2. The pipe 10 has an enlarged mouth 11 which may be secured to the under side of the frame work 4 by bolts 12 that secure the base 2 to the framework. Suitable air pipes 13 may be located in the body portion 14 of the carriage 1 for removing the air from the interior of the carriage and to direct the cooling air toward portions of the machine located near the furnace.

The portions of the machine supported by the base 2 are rotated by any suitable means that will operate the machine at the best working speed according to the relation of the delivery machine to the molding machine. The driving connection to the carriage 1, as shown in Fig. 1, is through a pair of bevel gear wheels 18 and 19. The bevel gear wheels 18 and 19 are mounted on shafts 20 and 21, respectively, rotatably supported in a bearing member 22. The bearing member 22 may be secured to the base 2 and framework 4. The upper end of the shaft 21 is provided with a gear wheel 23 which meshes with a ring gear wheel 24 located around the bottom edge of the carriage 1.

As the carriage 1 is rotated, tubular members or arms 30 having enlarged cup-shaped ends are moved to a point where the ends may be dipped into the molten glass located in the melting furnace. The members 30 are supported on carriages 31 rotatably mounted on rollers 32 located in guideways or channels formed in the inner sides of U-shaped members 33. The members 33 are bolted to the upper surface of the carriage 1 and the channels 34 and 35 are located in pairs in the sides of the members 33.

The channels 34, located at the inner end of the members 33, are curved upwardly at their outer ends, so that, as each carriage 31 is moved outward, the rollers 32 located in the channels 34 will cause the carriage 31 to tilt and thereby cause the outer ends of the members 30 to dip into the molten glass. The rollers 32 in the channels 35 at the end of their outward movement act as pivots for the carriage 31. The carriage 31 is reciprocated by a bell crank lever 36. The lever 36 is pivotally supported in brackets 37 bolted at their lower ends to the upper edges of the U-shaped members 33. The downward extending arm portion 38 of the lever 36 is slidably connected to the carriage 31. The second arm 39 of the bell crank lever 36 is provided with a roller 40. The roller 40 moves in a cam groove or channel 41 formed in a supporting member 42. The member 42 is secured by bolts 43 to an iron column or pipe 43ª extending through the vertical axis of the machine. The major portion of the channel 41 is located in a horizontal plane and is provided with descending and ascending portions 44 and 45 so that as the roller 40 on the arm 39 of the lever 36 follows the channel 41, the arm 38 will be swung forward and backward from the center of the machine, thereby reciprocating the carriage 31. The roller 40 moves in the descending portion 44 as the carriage 1 is being rotated to the dipping point or where the cup shaped end of the member 30 enters the molten glass. The approach of the roller 40 to the lowest point of the descending portion 44 occurs as the roller 32 located at the inner end of the carriage 31 is moved up the curved portion of the channel 34 in the member 33. The roller 40 then rises in the ascending portion 45 of the channel 41 and causes the bell crank lever 36 to return the carriage 31 and draw the tubular member 30 up and away from the furnace.

The carriage 1 is preferably provided with several U-shaped members 33 each supporting a tubular member 30 for receiving an amount of glass as it is moved into the furnace. In the form of construction shown in the drawings, six of the members 30 are located on the carriage 1. Thus as the carriage is moved through one sixth of its circle of rotation, one of the tubular members 30 will be moved in and out of the glass furnace by the movement of the roller 40 of the bell crank lever 36 in the channel 41.

In order to draw the glass into the tubular member 30, a vacuum system is provided which has connections to each of the members 30. The major portion of each member 30 extends beyond the carriage 31, the inner end of the member 30 being secured by bolts 50 to the carriage 31. The outer end of the member 30 which is dipped into the glass is provided with a hollow inverted suction gathering mold or cup 51 formed by an outer sleeve or casing 52 and an inner filler member 53. The member 53 has semi-cylindrical channels 54 located at equi-distant points in its outer surface and the body or wall of the member 53 between the channels 54 and the interior chamber or mold cavity 55 is slotted as at 49 to allow the drawing or sucking of air from the outside, which will induce the entrance of the glass into the chamber 55. Suitable passageways may also be formed in the top and bottom walls of the member 53. The member 53 is secured in a spider 56 located at the top of the sleeve 52 by a bolt and nut connection and the sleeve 52 is secured by bolts to the under side of a flange 57 formed at the end of the tubular member 30.

The lower end of the chamber 55 is closed by a sectional bottom plate comprising a pair of closure members or clappers 60 rotatably suspended from the member 30. The clappers 60 are semi-circular in form and along their inner flat surfaces are provided with a large conical groove 61. The grooves 61 of the clappers 60, when the clappers are located in a closed position, form a tapered circular opening or mouth 62 for the chamber 55. The clappers 60 also have grooves formed in their top surfaces and, when the clappers are closed, the grooves form a circular groove 63. Communicating passageways 64 connect the groove 63 with the mouth or cone shaped opening 62 and the openings formed in the bottom of the member 53 allow the sucking of air from the mouth 62 into the semi-cylindrical channels 54. Thus, when the tubular member 30 is moved outwardly and tilted into the furnace, the vacuum produced within the chamber 55 will operate to draw or suck the glass into the chamber 55.

The vacuum system is connected to the inner end of each tubular member 30 and to the chamber 55 through a flexible tubing 67 secured to the member 30 by a nut 68. The tubing 67 extends to a valve chamber 70 in which is located a valve 69, said chamber having an oval shaped body portion so that areas of equal size may be located on each side of the valve 69. The valve chamber 70 is supported on a bracket 71 bolted to the bracket 37. The bracket 71 is also provided with suitable connections for connecting the upper end of the tubing 67 with the valve chamber 70.

The valve 69 is operated by a rod 75 supported in a bracket 76 bolted to the top of the bracket 37. The rod 75 is provided with a spring 77 held by a pin 78 located in the rod 75, which holds the valve 69 shut when the vacuum system is to be closed. The end 79 of the rod 75 is provided with a roller 80 which travels on a cam 81. The cam 81 is formed of a series of arcuate plates located in a channel 82 formed in the outer surface of a wall 83 located on the top of the member 42. The cam plates 81 are secured in the channels by means of bolts 84. The roller 80 runs on the vertical side of the cam 81 and causes the rod 75 to open the valve 69 while the roller 80 is moving on the raised portion 85 of the cam. The portion 85 may be located in any part of the cam channel 82 so that the vacuum system will be opened during the period that the glass is to be sucked into the chamber 55 and for a short time thereafter. Fig. 15 illustrates the relative position and length of the raised portion 85 with respect to the remainder of the surface of the cam 81.

The top of each valve chamber 70 is connected to a pipe 88 having an elbow 89 and a straight section 90. The straight section 90 of the pipe 88 extends toward the vertical axial line of the machine. The end of the section 90 is bolted to a chamber or hollow head 91 located on the column 43ª and suitable packing rings 92 are located in the top and bottom of the head 91 between the inner wall of the head and the column to prevent the reduction of the vacuum by the in-take of air. The rings 92 are secured in their positions by plates 93 bolted to the top and bottom surfaces of the head 91. The inner wall 94 of the head 91 is provided with oval shaped openings 95 and the column or pipe 43ª has openings 96 formed in its wall for the connection of the vacuum system from the pipe 43ª to the valve chambers 70 through the pipes 88.

The pipe 43ª extends to the base of the machine and the lower end is closed by a threaded cap 97. The column or pipe 43ª may be connected to any suitable source for creating a vacuous condition by a pipe 98 leading out from the machine. The vacuum head 91 is provided with suitable connecting pipes 88 to each of the plurality of tubular members 30 and the openings 95 are so located in the inner wall 94 with respect to the opening 96 in the pipe 43ª as to maintain a constant vacuous condition in the head 91. Thus, as the members 51, having the delivery chambers 55 formed therein, are ready to dip into the furnace, the vacuum line is opened by the action of the roller 80 on the raised portion 85 of the cam 81 and the molten glass will be sucked into the chamber 55 through the mouth 62 formed by the clapper members 60.

After sucking in a quantity of the glass, the parts of the machine thus operating are raised and withdrawn from the furnace, as the roller 40 rides in the ascending portion 45 of the channel 41 by the reciprocation of the bell crank 36. As the bottom of the clappers 60 leaves the level of the glass, the strings of glass clinging to the clappers are wiped or sheared off by a knife member 100. The knife member 100 maintains its position over the mouth 62 temporarily to close the mouth 62 to prevent the glass from dropping out when the vacuous condition in the chamber 55 is reduced, or completely removed.

The knife 100 and the clappers 60 of each sucker or cup member 51 are supported from the tubular member 30 by the rods 101 and 103 and are operated by a piston action controlled by compressed air. The rods 101 and 103 are provided at their upper ends with levers 102. The rod 103 is hollow and a bearing sleeve 104 (Figs. 9 and 10) separates the rod 105 which operates the knife 100, from the rod 103 operating the clapper. The rod 105 is formed of two parts. The lower end of the upper part 106 is formed hollow and a pair of vertically extending slots 107 are formed diametrically opposite in the wall. The lower part 108 of the rod 105 has a reduced upper portion 109 which is reduced in diameter from the diameter of the rod 105. A pin 110 is located near the upper end of the portion 109 and extends into the slots 107 formed in the part 106 of the rod 105. The part 108 of the rod 105 may then be raised or lowered while the rod 105 is rotated to operate the knife 100. During the rotation of the rod 105, the knife is raised so as to clear the top of the clapper 60 located on the rod 103 as the clappers are opened to permit dropping of the glass. The part 108 of the rod 105 is moved upward by a pin 112 extending through the part 108 and located in a pair of slots 111 formed in the sleeve 104. The slots 111 have an upwardly curved section so located that the knife will completely clear the bottom of the clapper 60 before being raised.

This positioning of the knife is also necessary to remove the knife from the glass area when the clappers are dipped in the glass, otherwise the knife will become overheated or coated with glass and fail to perform its desired function.

The upper end of the rod 105 projects beyond the top of the lever 102 on the hollow rod 103 and is provided with a lever 113. The levers 102 and the lever 113 are actuated by rods 114 and 115, respectively, which are mounted on the top of the tubular member 30 in a bearing 116. The rods 114 and 115 are connected to the pistons 117 and 118 located in the cylinders 119 and 120. The movement of the pistons 117 and 118 in the cylinders 119 and 120 is controlled by compressed air in one direction and by springs 121 and 122 in the reverse direction. The cylinders 119 and 120, located on each of the members 30, are connected by the flexible hose 123 and 124 to a valve box 125. The valve box 125 may be secured to or formed integrally with the valve chamber 70. The interior of the valve box is divided into five compartments by division walls 126 (Fig. 5). The compartment 127 allows the incoming compressed air free passage to either of the valves 128 and 129. The valves 128 and 129 are located on rods 130 and 131. The rods 130 and 131 are provided at their ends with rollers 132 moving on cams which are similar in construction to the cam 81 described above. They are formed of arcuate plates and secured in channels 82 formed in the wall 83 by the bolts 84. As the carriage 1 rotates, the valves on each of the operating sections of the machine will be actuated according to the locations of the raised portions of the cams.

In order to feed a plurality of machines with glass, the number of cams may be increased and, in the form of construction shown, I have provided for feeding two molding machines by varying the location of the cams for operating the rods 130 and 131 by the rollers 132 located in the ends of the rods.

The rollers 132 for actuating the rods 130 on three of the operating sections travel on the cam 140 and rollers 132 controlling the rods 130 on the alternating three sections travel on the cam 141. Likewise, the rollers 132 for controlling the rods 131 travel on the cams 142 and 143. The sections one, three, and five, therefore, will feed the first machine while the sections two, four and six will operate to release the glass to the second machine at a point further around in the rotation of the carriage. Figs. 11 and 13 illustrate the relative locations of the raised parts 149 of the cams 143 and 142 where it is desired to open the clappers and drop the glass. Figs. 12 and 14 illustrate the raised portions 150 of the cams 140 and 141 which control the operation of the knife 100, the raised portions 150 operating to cause the admission of compressed air to move the knife from below the clappers 60. The rollers 132, travelling on the cam 140 and 142 are, located in the ends of the rods 130 and 131. The rollers 132 travelling on the cams 141 and 143 are rotatably supported above the rods 130 and 131 by short shafts 155.

As the rollers 132 travel to and over the raised areas of the cams, the valves 128 and 129 are opened and the compressed air permitted to pass through the hose 123 or 124 to the cylinders 119 or 120. When the glass has been sucked into the chamber 55, the rollers 132 travelling on the cams 140 and 141 drop off the raised portion 150 of the cams and the rod 131 moves to close the valve 129 by the pressure of a spring 156 located between the supporting bracket 76 and a pin 158 in the rod 131. The spring 122 in the cylinder 120 then is released and draws the rod 115 in an inward direction, causing the lever 113 to swing the knife 100 under the clappers 60. The air in the hose 124 and the cylinder 120 is expelled from the valve box 125 through a valve 160 which opens as the valve 129 is closed. The air from the chamber 127, when the valve 129 is open, passes into a second chamber 161 and thence to the flexible hose 124. The air returns to the chamber 161 and, since the valve 129 is closed and the valve 160 is open, the air passes from the chamber 161 into a third chamber 162 and out through the air opening 163. The movement of the air is similar in both the lower and upper half of the valve box 125, the rod 130 being provided with a second valve 165 which allows the air to escape into a third chamber 162 and out through an opening 163.

When the carriage 1 approaches the point at which the glass is to be dropped, the rollers 132 moving on the cams 140 and 141 drop off the raised portion 150 and the knife 100 moves from below the clappers. The clappers 60 are then actuated by the movement of the rollers 132 on the rod 130. The rollers 132 on the rod 130 travel on the cams 142 and 143. After the knife 100 opens, the rollers 132 located on the ends of the rods 130 travel on to the raised portion 149 of the cams 142 and 143 and open the valve 128. The compressed air then passes through the box 125, the hose 123, into the cylinder 119. The piston 117 on the rod 114 then forces the levers 102 outward, the ends of the levers being slotted to allow for the arcs of their swing. As the opening in the bottom of the chamber 55 becomes larger, the glass drops from the chamber. The raised portion 149 of the cams 142 and 143 is short and the open period of the clappers is only momentary since they must be closed when a new quantity of glass is drawn into the chamber 55.

The chamber 127 of the valve box 125 is supplied with compressed air from a hollow head 170 through the pipes 171. The head 170 is located on a pipe 172 having a base part 173. The base 173 is secured to and closes the top of the column 44. The compressed air is delivered to the pipe 172 by a pipe 174 which is located in the center of the column 44. Connection is made to an outside source of supply by a pipe 175, located at the base of the machine, which extends into the column for connection with the pipe 174. The head 170 is packed against leakage by suitable packing rings 177 and plates 178 which are bolted to the top and bottom surfaces of the head 170.

Both the vacuum head 91 and the compressed air head 170 are rotatably supported on the column 44 and the extension pipe member 172 by means of the pipes 88 and 171, which connect the heads to the valve chambers 70 and 125. In this manner, the heads 91 and 170 rotate freely with the carriage 1, the compressed air and vacuum being communicated to the heads through the oval openings located in the inner walls of the heads 91 and 170, the column 44 and the pipe 172.

In the form of construction illustrated in Figs. 17 to 21, inclusive, I have provided a means for conveying a plurality of charges of glass upon each delivery to machines having a plurality of sets of molds. This is particularly advantageous where smaller glass ware is being manufactured and where a plurality of matrices are located in mold boxes used by one or more of the glass forming machines. Thus, the modified form will increase the rate of production without varying the operation of any of the glass forming machines.

The tubular members 30, in the modified form, shown in the figures, have oval shaped ends 180 which are provided with flanges 181. The outer sleeve 182 for supporting the member 183 having the vacuum chambers 184 and 185 is bolted to the under surface of the flange 181. The member 183 is secured in the sleeve 182 by the nut and bolt connections 186, the sleeve being provided in its upper end with a spider 176 for this connection.

The chambers 184 and 185 have a smaller diameter than the chamber 55 since the quantities of glass to be located therein are smaller. Suitable semi-cylindrical channels 188 are formed in the sides of the member 183 and communicating slots or passageways 189 connect the channels 188 to the chambers 184 and 185. The member 183 also has a well 190 located in its central portion and communication with the chambers is made through the slots or passageways 191. The bottoms of the channels 188 and the well 190 are provided with circular passageways 192 which extend to the bottom of the member 183 and the openings 192 allow the creation of a vacuum through the body of the clappers 193 by the circular grooves 194 and the passageways 195 to the mouths 196 of the clappers 193. The mouths 196 of the clappers are formed, when the clappers are closed, by large tapering grooves 197 formed in the inner flat sides of the clappers 193. The clappers 193, as well as the knife 198, are supported on the rods 101 and 103. The rods 101 and 103 are operated by the movement of the levers 102 actuated by the compressed air rod 114. The knife 198 is longer and is caused to operate, as described above, being connected to a rod 105, which is actuated, by the lever 113 and the compressed air rod 115, to sever strings of glass from the mouths 196.

I claim:

1. In a glass machine, a plurality of cups, means for shifting the cups horizontally, a suction means for producing a vacuous condition within the cups, a plurality of cam members, one for operating the shifting means and another for controlling the suction means, a clapper for partially closing the cups, and a pneumatic means for operating the clapper, one of the cam members operating to control the said pneumatic means.

2. In a glass machine, a plurality of cups, means for shifting the cups horizontally, a suction means for producing a vacuous condition within the cups, a plurality of cam members, one for operating the shifting means and another for controlling the suction means, a clapper for partially closing the cups, a pneumatic means for operating the clapper, one of the cam members operating to control the said pneumatic means, a knife for severing the strings from beneath the cups, and a pneumatic means for operating the knife, the last named pneumatic means controlled by one of the cam members.

3. In a glass machine, a rotatable frame, a plurality of cups supported on the frame, means for producing a vacuous condition within the cups, a clapper for partially closing the lower end of each cup, a pneumatic means for operating the clapper, fixed cam members for controlling the vacuum producing means and the pneumatic means.

4. In a glass machine, a rotatable frame, a plurality of cups supported on the frame, means for producing a vacuous condition within the cups, clappers for partially closing the lower end of each cup, a pneumatic means for operating the clappers, a knife movable vertically with respect to each cup and horizontally for severing the strings of glass from the cups, a pneumatic means for operating the knife, and fixed cam members for controlling the vacuum producing means and the said pneumatic means as the frame is rotated.

5. In a glass gathering machine, the combination of a gathering cup or mold opening downwardly, a bottom plate therefor comprising hinged sections mounted to swing to and from each other beneath the mold, said bottom plate being provided with an opening therethrough for the introduction of glass into the mold, and a knife pivoted to swing about an axis coincident with the axis of one of said bottom sections.

6. In a glass machine, the combination of a carriage rotatable about a vertical axis, a radially disposed arm mounted thereon, a gathering cup or mold at the outer end of said arm, means for reciprocating said arm lengthwise for moving the mold toward and from the center of the machine, and guideways controlling the movement of said arm and shaped to tilt the arm as it approaches the limit of its outward movement and thereby move the gathering cup or mold downward to a charge receiving position.

7. The combination of a carriage rotatable about a vertical axis, an arm disposed radially of the carriage, a gathering cup or mold at the outer end of said arm, means to reciprocate the arm radially of said carriage, radially disposed guideways on the carriage, and guide rolls carried on said arm and running in said guideways, one of said guideways being shaped to tilt the arm as it approaches the limit of its outward movement and thereby lower the gathering cup or mold.

8. In a glass machine, a plurality of cups, means for shifting the cups horizontally, a suction means for producing a vacuous condition within the cups, a plurality of cam members, one for operating the shifting means and another for controlling the suction means, a clapper for partially closing the cups, and means for operating the clapper, one of the cam members operating to control the said clapper operating means.

9. In a machine for gathering charges of molten glass, the combination of a rotary mold carriage, an annular series of downwardly opening molds on said carriage, means for applying suction to the molds at the predetermined point and causing glass to enter the molds, and automatic means for causing the discharge of the gathered glass from succeeding molds at points spaced apart in the path of travel of said mold.

10. In a machine for gathering charges of molten glass, the combination of a rotary mold carriage, an annular series of downwardly opening molds on said carriage, a bottom plate movable into and out of position beneath each mold and having an opening therethrough for the introduction of glass into the mold, means for exhausting the air from said molds one at a time in a predetermined zone for causing glass to enter the molds, mechanisms for removing said plates from beneath the molds, and means whereby the plate removing mechanisms of adjacent molds are caused to operate at different points spaced apart in the path of travel of the molds to thereby cause discharge of glass at different points.

In witness whereof I have hereunto signed my name to this specification.

JOHN F. DOWLING.